United States Patent
Des Cognets et al.

(10) Patent No.: US 11,818,617 B2
(45) Date of Patent: Nov. 14, 2023

(54) DEVICE AND METHOD FOR BANDWIDTH PART SWITCH AT TERMINAL DEVICES

(71) Applicant: Nokia Solutions and Networks Oy, Espoo (FI)

(72) Inventors: Yves Des Cognets, Magny-les-Hameaux (FR); Deepak Prabhu Kanlur, Bangalore (IN); Gabriel-Ioan Mihon, Nozay (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/084,087

(22) Filed: Dec. 19, 2022

(65) Prior Publication Data
US 2023/0199593 A1  Jun. 22, 2023

(30) Foreign Application Priority Data
Dec. 21, 2021  (FI) ................................ 20216312

(51) Int. Cl.
| | |
|---|---|
| H04W 72/14 | (2009.01) |
| H04W 72/12 | (2023.01) |
| H04W 72/04 | (2023.01) |
| H04L 5/00 | (2006.01) |
| H04L 5/14 | (2006.01) |

(Continued)

(52) U.S. Cl.
CPC ........... *H04W 36/06* (2013.01); *H04L 5/0055* (2013.01); *H04W 72/0446* (2013.01); *H04W 72/0453* (2013.01)

(58) Field of Classification Search
CPC ............. H04W 36/06; H04W 72/0446; H04W 72/0453; H04L 5/0055
See application file for complete search history.

(56) References Cited

U.S. PATENT DOCUMENTS

| | | | |
|---|---|---|---|
| 2019/0103954 A1 | 4/2019 | Lee et al. | ............... 5/98 |
| 2020/0145169 A1 | 5/2020 | Zhou et al. | |

(Continued)

FOREIGN PATENT DOCUMENTS

| | | |
|---|---|---|
| EP | 3478 019 A1 | 5/2019 |
| WO | WO 2021/027887 A1 | 2/2021 |
| WO | WO-2021/056539 A1 | 4/2021 |

OTHER PUBLICATIONS

Mediatek Inc., "CR on TS38.133 for BWP switch test case (section A.4.5.6.1)," 3GPP TSG-RAN4 Meeting #91, R4-1905805, Reno, US, May 13-17, 2019.

(Continued)

*Primary Examiner* — Melvin C Marcelo
(74) *Attorney, Agent, or Firm* — Harrington & Smith

(57) ABSTRACT

A network entity for switching a source bandwidth part used by a terminal device to a target bandwidth part. The network entity includes circuitry configured for sending a triggering message at a triggering time slot to the terminal device, the triggering message including: a first information indicating the target bandwidth part; a second information indicating to the terminal device to schedule reception of data from the network entity at a target reception time slot; a third information indicating to the terminal device to schedule transmission of a data reception acknowledgment or non-acknowledgment message to the network entity at a target transmission time slot.

11 Claims, 4 Drawing Sheets

(51) Int. Cl.
*H04L 1/18* (2023.01)
*H04W 74/00* (2009.01)
*H04L 27/26* (2006.01)
*H04W 36/06* (2009.01)
*H04W 72/0446* (2023.01)
*H04W 72/0453* (2023.01)

(56) References Cited

U.S. PATENT DOCUMENTS

2020/0351729 A1    11/2020  Rastegardoost et al. ......... 36/72
2022/0166594 A1*    5/2022  Zhang ................... H04W 72/21
2023/0070567 A1*    3/2023  Wang ................ H04W 72/0453

OTHER PUBLICATIONS

Huawei et al., "Other Remaining issues for Rel-16 Power saving," 3GPP TSG Ran WG1 Meeting #100-e, R1-2001104, Feb. 24-Mar. 6, 2020.

* cited by examiner

10

DEVICE AND METHOD FOR BANDWIDTH PART SWITCH AT TERMINAL DEVICES

TECHNICAL FIELD

Various example embodiments relate generally to devices, methods, and computer program products for switching a source bandwidth part user by a terminal device to a target bandwidth part.

BACKGROUND

Bandwidth part (BWP) is a new concept that has been introduced in the 5G New Radio (5G NR) with the $3^{rd}$ Generation Partnership Project (3GPP) Release 15 specifications to enable more flexibility in how resources are assigned in a given carrier. A terminal device supporting the BWP can use smaller bandwidths than the carrier bandwidth used by the base station. Therefore, even when the user equipment supports a sufficiently wide bandwidth, it is possible to set a narrower BWP when there is no or low data traffic, thereby reducing the communication bandwidth and power consumption.

The base station uses higher-layer signaling to set up a BWP configuration for the terminal device with possibly up to four BWPs to use during communication, only one BWP being active at a given time.

The base station performs switching BWP to dynamically switch the active BWP of the terminal device by sending within downlink control information (DCI) messages information containing a bandwidth part indicator field indicating an active BWP different from the current active BWP at the terminal device. This operation is referred to as DCI-based BWP switch.

DCI messages are transmitted over control channels for scheduling uplink transmissions from the terminal device to the base station (also referred to as 'Uplink grant') or scheduling downlink transmissions from the base station to the terminal device (also referred to as 'Downlink grant').

DCI-based BWP switch enables thus switching the active bandwidth part at the terminal device per direction (uplink or downlink) when there is Uplink or Downlink grants. However, such an operation is not adapted to perform BWP switch when there is no Uplink and/or Downlink grant to send to the terminal device. Moreover, such BWP switch operation does not enable the base station to have a feedback on the success or failure of the BWP switch at the terminal device.

There is accordingly a need for improved bandwidth part switching devices and methods.

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

In a first aspect, there is provided a network entity for switching a source bandwidth part used by a terminal device to a target bandwidth part, the network entity comprising means for sending a triggering message at a triggering time slot to the terminal device, the triggering message comprising:

a first information indicating the target bandwidth part;

a second information indicating to the terminal device to schedule reception of data from the network entity at a target reception time slot, the target reception time slot starting at a number of slots after the triggering time slot, the number of slots being higher than a bandwidth switch delay related to the terminal device;

a third information indicating to the terminal device to schedule transmission of a data reception acknowledgment or non-acknowledgment message to the network entity at a target transmission time slot, the target transmission time slot starting after a number of slots at least equal to two after the target reception time slot.

In an embodiment, the network entity comprises means for checking if a data reception non-acknowledgment message is received from the terminal device at the target transmission time slot, the means for sending the triggering message being configured, if no data reception non-acknowledgment message is received at the target transmission time slot, to perform at least one iteration of a bandwidth switch operation, a current iteration comprising:

sending a current first message to the terminal device at a current first time slot over the source bandwidth part considered as active at the terminal device and checking if a data reception non-acknowledgement message is received from the terminal device at a current first target transmission time slot;

if no data reception non-acknowledgement message is received, sending a current second message to the terminal device at a current second time slot over the target bandwidth part considered as active at the terminal device and checking if a data reception non-acknowledgement message is received from the terminal device at a current second target transmission time slot.

The current first message, respectively the current second message, comprise:

a current first information indicating the target bandwidth part;

a current second information indicating to the terminal device to schedule reception of data from the network entity at a current first, respectively second, target reception time slot, the current first, respectively second, target reception time slot starting at a number of slots respectively after the current first, respectively second, time slot, the numbers of slots and being higher than the bandwidth switch delay related to the terminal device;

a current third information indicating to the terminal device to schedule transmission of a data reception acknowledgment or non-acknowledgment message to the network entity at the current first, respectively second, target transmission time slot, the current first, respectively second, target transmission time slot starting after a number of slots respectively at least equal to two after the current first, respectively second, target reception time slot.

In an embodiment, the data reception non-acknowledgement message is indicative of a successful switch, at the terminal device of the source bandwidth to the target bandwidth.

In an embodiment, the triggering message, the current first message and the current second message are sent over physical downlink control channels.

In an embodiment, the data reception non-acknowledgement message is sent over a physical uplink control channel.

In an embodiment, the numbers of slots are equal to the incrementation by one time slot of the bandwidth part switch delay related with the terminal device.

In an embodiment, the target reception time slot, the current first and current second target reception time slot correspond to downlink time slots at which data is scheduled on physical downlink shared channels and the target transmission time slot, the current first and current second correspond to uplink time slots at which the transmission of the data reception non-acknowledgement message is scheduled on physical uplink control channels.

In an embodiment, the current first message comprises a frequency domain information dependent on the size of the source bandwidth part.

In an embodiment, the current second message comprises a frequency domain information dependent on the size of the target bandwidth part.

In a second aspect, there is provided a method for switching a source bandwidth part used by a terminal device to a target bandwidth part. The method comprises sending a triggering message at a triggering time slot to the terminal device, the message comprising:
- a first information indicating the target bandwidth part;
- a second information indicating to the terminal device to schedule reception of data from the network entity at a target reception time slot, the target reception time slot starting at a number of slots after the triggering time slot, the number of slots being higher than a bandwidth switch delay related with the terminal device;
- a third information indicating to the terminal device to schedule transmission of data reception acknowledgment or non-acknowledgment message to the network entity at a target transmission time slot, the target transmission time slot starting after a number of slots at least equal to two after the target reception time slot.

In an embodiment, the method comprises checking if a data reception non-acknowledgment message is received from the terminal device at the target transmission time slot and if no data reception non-acknowledgment message is received at the target transmission time slot, performing at least one iteration of a bandwidth switch operation, a current iteration comprising:
- sending a current first message to the terminal device at a current first time slot over the source bandwidth considered as active at the terminal device, and checking if a data reception non-acknowledgement message is received from the terminal device at a current first target transmission time slot;
- if no data reception non-acknowledgement message is received, sending a current second message to the terminal device at a current second time slot over the target bandwidth considered as active at the terminal device, and checking if a data reception non-acknowledgement message is received from the terminal device at a current second target transmission time slot.

In a third aspect, there is provided an utilization of the method for switching a source bandwidth part used by a terminal device to a target bandwidth part according to any preceding feature for switching downlink bandwidth parts in a communication system based on a time division duplex technology.

In a fourth aspect, there is provided a non-transitory computer-readable medium storing computer-executable instructions that, when executed by at least one processor at an apparatus, cause the apparatus to perform the method for switching a source bandwidth part used by a terminal device to a target bandwidth part as disclosed herein.

Generally, the computer-executable instructions cause the apparatus to perform one or more or all steps of the method for switching a source bandwidth part used by a terminal device to a target bandwidth part as disclosed herein.

Generally, the network entity for switching a source bandwidth part used by a terminal device to a target bandwidth part comprises means for performing one or more or all steps of the method for switching a source bandwidth part used by a terminal device to a target bandwidth part as disclosed herein. The means include circuitry configured to perform one or more or all steps of the method for switching a source bandwidth part used by a terminal device to a target bandwidth part. The means may include at least one processor and at least one memory including computer program code, the at least one memory and the computer program code being configured to, with the at least one processor, cause the network entity to perform one or more or all steps of the method for switching a source bandwidth part used by a terminal device to a target bandwidth part as disclosed herein.

In a fifth aspect, there is provided a data structure for storing information for switching a source bandwidth part used by a terminal device to a target bandwidth part, the data structure comprising data fields comprising:
- a first data field comprising a first value field, the first value field comprising information indicating the target bandwidth part;
- a second data field comprising a second value field, the second value field comprising information indicating to the terminal device to schedule reception of data from the network entity at a target reception time slot, the target reception time slot starting at a number of slots after a current time slot, the number of slots being higher than a bandwidth switch delay related to the terminal device;
- a third data field comprising a third value field, the third value field comprising information indicating to the terminal device to schedule transmission of data reception acknowledgment or non-acknowledgment message to the network entity at a target transmission time slot, the target transmission time slot starting after a number of slots at least equal to two after the target reception time slot.

In a sixth aspect, there is provided an apparatus for switching a source bandwidth part used by a terminal device to a target bandwidth part, the apparatus comprising
at least one processor; and
at least one memory including computer program code;
the at least one memory and the computer program code configured to, with the at least one processor, cause the apparatus at least to send a triggering message at a triggering time slot to the terminal device, the triggering message comprising:
- a first information indicating the target bandwidth part;
- a second information indicating to the terminal device to schedule reception of data from the apparatus at a target reception time slot, the target reception time slot starting at a number of slots after the triggering time slot, the number of slots being higher than a bandwidth switch delay related to the terminal device;
- a third information indicating to the terminal device to schedule transmission of data reception acknowledgment or non-acknowledgment message to the apparatus at a target transmission time slot, the target transmission time slot starting after a number of slots at least equal to two after the target reception time slot.

In an embodiment, the at least one memory and the computer program code are configured to, with the at least one processor, cause the apparatus to check if a data reception non-acknowledgment message is received from the terminal device at the target transmission time slot, and if no data reception non-acknowledgment message is received at the target transmission time slot, to perform at least one iteration of a bandwidth switch operation, a current iteration comprising:

sending a current first message to the terminal device at a current first time slot over the source bandwidth part considered as active at the terminal device and checking if a data reception non-acknowledgement message is received from the terminal device at a current first target transmission time slot;

if no data reception non-acknowledgement message is received, sending a current second message to the terminal device at a current second time slot over the target bandwidth part considered as active at the terminal device and checking if a data reception non-acknowledgement message is received from the terminal device at a current second target transmission time slot.

BRIEF DESCRIPTION OF THE DRAWINGS

The accompanying drawings, which are incorporated in and constitute a part of this specification, illustrate example embodiments together with the general description given above, and the detailed description given below.

Figure 1:
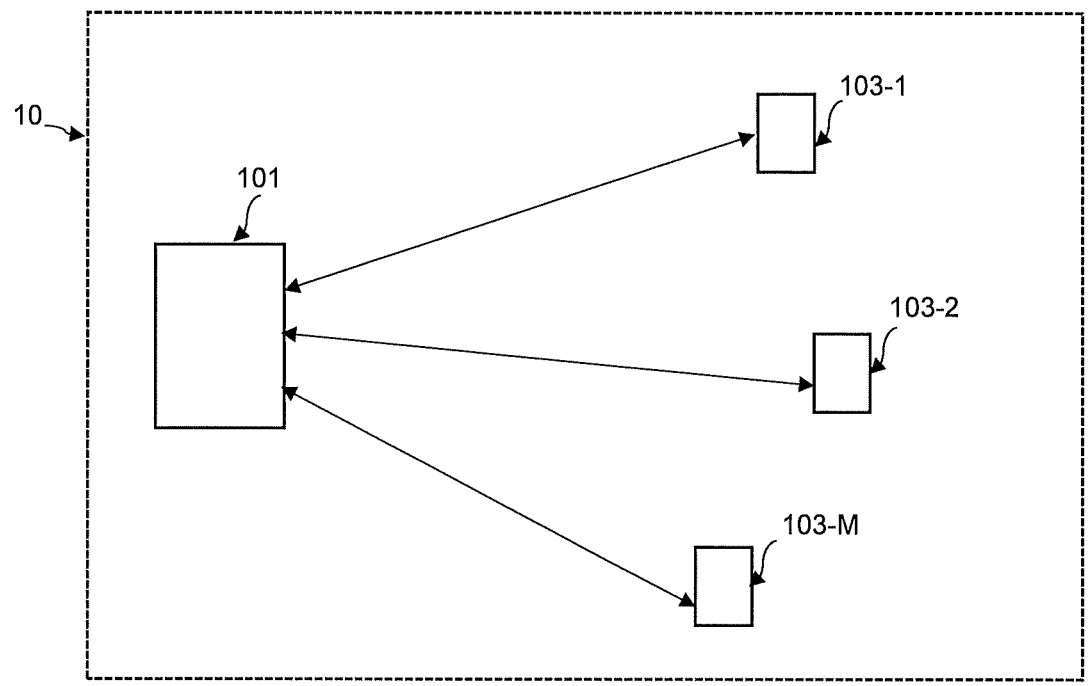
FIG. 1 is a schematic diagram illustrating an exemplary communication system in which exemplary embodiments may be implemented.

It should be noted that these drawings are intended to illustrate the general characteristics of devices, methods, and structures utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Detailed example embodiments are disclosed herein. However, specific structural and functional details disclosed herein are merely representative for purposes of describing example embodiments. The example embodiments may, however, be embodied in many alternate forms and should not be construed as limited to only the embodiments set forth herein. Accordingly, while example embodiments are capable of various modifications and alternative forms, the embodiments are shown by way of example in the drawings and will be described herein in detail. It should be understood, however, that there is no intent to limit example embodiments to the particular forms disclosed.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

Exemplary embodiments provide devices, methods and computer program products for switching a source bandwidth used by a terminal device to a target bandwidth part.

FIG. 1 is a schematic diagram illustrating an exemplary communication system 10 in which the devices, methods and computer program products for switching a source bandwidth part used by a terminal device to a target bandwidth part, may be implemented.

The communication system 10 comprises a network entity 101 and one or more terminal devices 103-1 to 103-M with M designating the total number of terminal devices operating in the communication system 10.

The terminal device 103-$m$ with m=1, ..., M may be any fixed or mobile device/system/object provided with the required hardware and/or software technologies enabling wireless communications and transfer of data and/or signals and/or messages to the network entity 101. Exemplary terminal devices comprise, without limitation, mobile phones (also referred to as user equipments), laptops, tablets, robots, sensors, wearables, Machine-to-Machine devices, Internet of Things (IoT) devices, Vehicle-to-everything (V2X) devices (e.g. vehicles, infrastructure connected devices).

The network device 101 may be any device configured to operate in a wireless network to serve one or more terminal devices 103-$m$. Exemplary network devices 101 comprise, without limitation radio access network entities such as base stations (e.g. cellular base stations like eNodeB in LTE and LTE-advanced networks and gNodeB used in 5G networks, and femtocells used at homes or at business centers).

The communication system 10 implements the BWP concept as introduced in the specifications 5G New Radio (5G NR) with the $3^{rd}$ Generation Partnership Project (3GPP) Release 15.

Downlink data transmission in the communication system 10 is performed using non-acknowledgment-based protocols according to which a terminal devices 103-$m$ (m=1, ..., M) sends to the network entity 101 a data reception non-acknowledgment message when a transmission problem occurs and the terminal device 103-$m$ fails to receive the data sent by the network entity 101. For example the non-acknowledgment-based protocol implemented in the above-mentioned 5G specification is the Hybrid automatic repeat request (HARQ) protocol.

Each of the one or more terminal devices 101-$m$ with m=1, ..., M uses, at a given time, a source bandwidth part denoted by BWP-S$_m$.

The network entity 101 manages the bandwidth part configurations and triggers the bandwidth part switch at a terminal device 103-$m$ when the network entity 101 decides that the terminal device 103-$m$ should stop operating at the source bandwidth part BWP-S$_m$ and should switch to a target bandwidth part denoted by BWP-T$_m$.

For example, based on dynamic measurements of the data traffic of the terminal device 103-$m$, the network entity 101 decides whether the terminal device 103-$m$ should continue operating using as active bandwidth part the source bandwidth part or should operate on a narrower or a larger target bandwidth part. For example, when the source bandwidth part is a large bandwidth part and the data traffic is low, the network entity 101 decides to trigger the switching of the source bandwidth part to a narrower target bandwidth part. In another example, when the source bandwidth part is a narrow bandwidth part and the data traffic is high, the network entity 101 decides to trigger the switching of the source bandwidth part to a larger target bandwidth part.

A bandwidth part configuration enables configuring a plurality of parameters on the terminal device 103-$m$ including, without limitation, a bandwidth, a frequency position, and subcarrier spacing.

In the communication system 10, transmissions of data/signals/messages from the network entity 101 to a terminal device 103-$m$ (respectively from a terminal device 103-$m$ to the network entity 101) are referred to as downlink transmissions (respectively uplink transmissions). The uplink and downlink transmissions are performed according to time division duplexing (TDD) such that the uplink and downlink transmissions use the same frequency spectrum but in different time slots. Time is divided up into short slots among which some time slots are designated for uplink transmissions while others are designated for downlink transmission. The frequency spectrum is called in this case unpaired spectrum.

The terminal devices 103-$m$ (with m=1, . . . , M) support the bandwidth part concept such that each terminal device 103-$m$ is configured to use up to four bandwidth parts during communication such that only one bandwidth part is active at a given time.

A bandwidth part is defined by direction. This means that the terminal device 103-$m$ is configured to use up to four bandwidth parts during uplink transmissions (referred to as 'uplink BWPs') and up to four bandwidth parts during downlink transmissions (referred to as 'downlink BWPs'). More specifically, the terminal device 103-$m$ is configured with a bandwidth part identifier for each downlink bandwidth part (respectively uplink bandwidth part) from the set of the four downlink bandwidth parts (respectively downlink bandwidth parts) that it can use.

A downlink bandwidth part is paired with an uplink bandwidth part. Therefore, downlink and uplink bandwidth part switching is common for both downlink and uplink. Since the downlink bandwidth part is paired with a source uplink bandwidth part, switching the source downlink bandwidth part to a target downlink bandwidth part induces switching the uplink source uplink bandwidth part to a target uplink bandwidth part.

Without loss of generality and for simplification reasons, the following description will be made with reference to the switching of a source bandwidth part BWP-S$_m$ used by a terminal device 103-$m$ to a target bandwidth part BWP-T$_m$, the source bandwidth part referring similarly to a downlink or an uplink bandwidth part.

Figure 2:
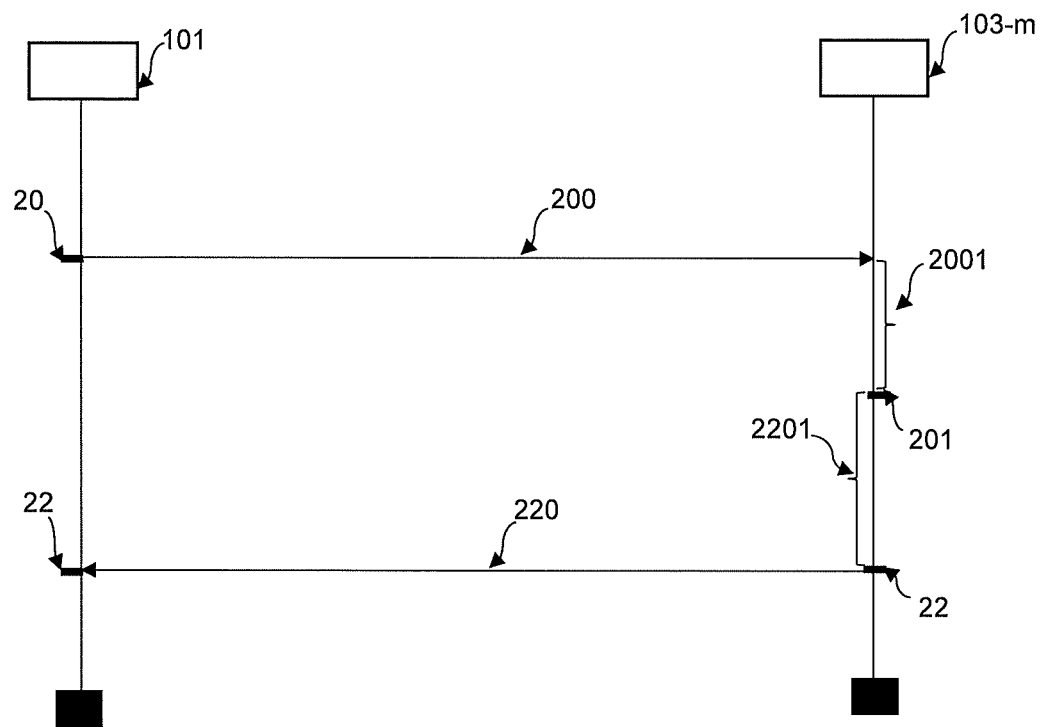
FIG. 2 is a connection flow illustrating an exemplary implementation of the switching of a source bandwidth part to a target bandwidth part, according to some embodiments.

FIG. 2 is a connection flow illustrating an exemplary implementation of the switching of a source bandwidth part to a target bandwidth part, according to some embodiments. In the connection flow of FIG. 2, transmission time intervals are not represented for simplification reasons.

The network entity 101 triggers the switching of the source bandwidth part BWP-S$_m$ used by a terminal device 103-$m$ to a target bandwidth part BWP-T$_m$ by sending at a triggering time slot 20 a triggering message 200 to the terminal device 103-$m$. The triggering message 200 comprises:

a first information indicating the target bandwidth part BWP-T$_m$;

a second information indicating to the terminal device 103-$m$ to schedule reception of data from the network entity 101 at a target reception time slot 201.

a third information indicating to the terminal device 103-$m$ to schedule transmission of data reception acknowledgment or non-acknowledgment message to the network entity 101 at a target transmission time slot 22.

The target reception time slot 201 starts at a number of time slots 2001 after the triggering time slot 20 which is higher than a bandwidth switch delay related to the terminal device 103-$m$.

In general, the bandwidth switch delay is defined as the time slot offset between the time slot in which the terminal device 103-$m$ receives a bandwidth switch request from the network entity 101 and the time slot in which the terminal device 103-$m$ shall be able to receive (for downlink bandwidth part switch) or transmit (for uplink bandwidth part switch) data on the new bandwidth part. The target reception time slot 201 thus starts at earliest at the time slot following the end of the bandwidth switch delay, i.e. at a number of time slots 2001 at least equal to the incrementation by one time slot of the bandwidth delay related to the terminal device 103-$m$.

The target transmission time slot 22 starts after a number of slots 2201 at least equal to two after the target reception time slot 201. The target reception time slot 201 corresponds to a downlink time slot during which the reception of data from the network entity 101 is scheduled at the terminal device 103-$m$. The target transmission time slot 22 corresponds to an uplink time slot during which the transmission of a data reception non-acknowledgment message from the terminal device 103-$m$ to the network entity 101 is scheduled. Scheduling the target transmission time slot 22 to start after a number of slots 2201 at least equal to two after the target reception time slot 201 guarantees that the terminal device 103-$m$ ends decoding data sent by the network entity 101 before the target transmission time slot 22 starts.

The network entity 101 indicates in the second information to the terminal device 103-$m$ to schedule reception of data from the network entity 101 at the target reception time slot 201 but will not send any data to the terminal device 103-$m$ at the target reception time slot 201. As a consequence, assuming that the terminal device 103-$m$ has received and decoded the triggering message forcing the bandwidth part switch, the terminal device 103-$m$ expects to receive data from the network entity 101 at the target reception time slot 201. And since the network entity 101 will not send any data to the terminal device 103-$m$ at the target reception time slot 201, the terminal device 103-$m$ sends, at the target transmission time slot 22, a data reception non-acknowledgment message 220 to the network entity 101 indicating that the terminal device 103-$m$ didn't receive the data it was expecting to receive from the network entity 101 at the target reception time slot 201 and requesting retransmission of data.

Receiving the data reception non-acknowledgement message from the terminal device 103-m at the target transmission time slot 22 is indicative to the network entity 101 that the terminal device 103-m has received and decoded the message for the bandwidth part switch. This indicates to the network entity 101 that the terminal device 103-m has successfully switched the active source bandwidth part BWP-S$_m$ to the target bandwidth part BWP-T$_m$. The target bandwidth part BWP-T$_m$ becomes the active bandwidth part used at the terminal device 103-m. This means that the data reception non-acknowledgment message 220 is indicative of the successful switch, at the terminal device 103-m, of the source bandwidth part BWP-S$_m$ to the target bandwidth part BWP-T$_m$.

The reception of the data reception non-acknowledgment message 220 at the target transmission time slot 22 provides the network entity 101 with a feedback on the success of the bandwidth part switch at the terminal device 103-m.

On the contrary, if the network entity 101 does not receive the data reception non-acknowledgment message from the terminal device 103-m at the target transmission time slot 22 scheduled for transmitting the data reception non-acknowledgment message, the network entity 101 has no information whether:
  the terminal device 103-m did not receive or received and did not decode the triggering message 200 sent at the triggering time slot 20 and consequently still has as active bandwidth part the source bandwidth part, or
  the terminal device 103-m has received and decoded the triggering message 200 sent at the triggering time slot 20 including the information to perform bandwidth part switch, has switched the source bandwidth part to the target bandwidth part accordingly, and has sent the data reception non-acknowledgment message 220 at the scheduled target transmission time slot 22, but the data reception non-acknowledgment message 220 has been lost on the air.

Figure 3:
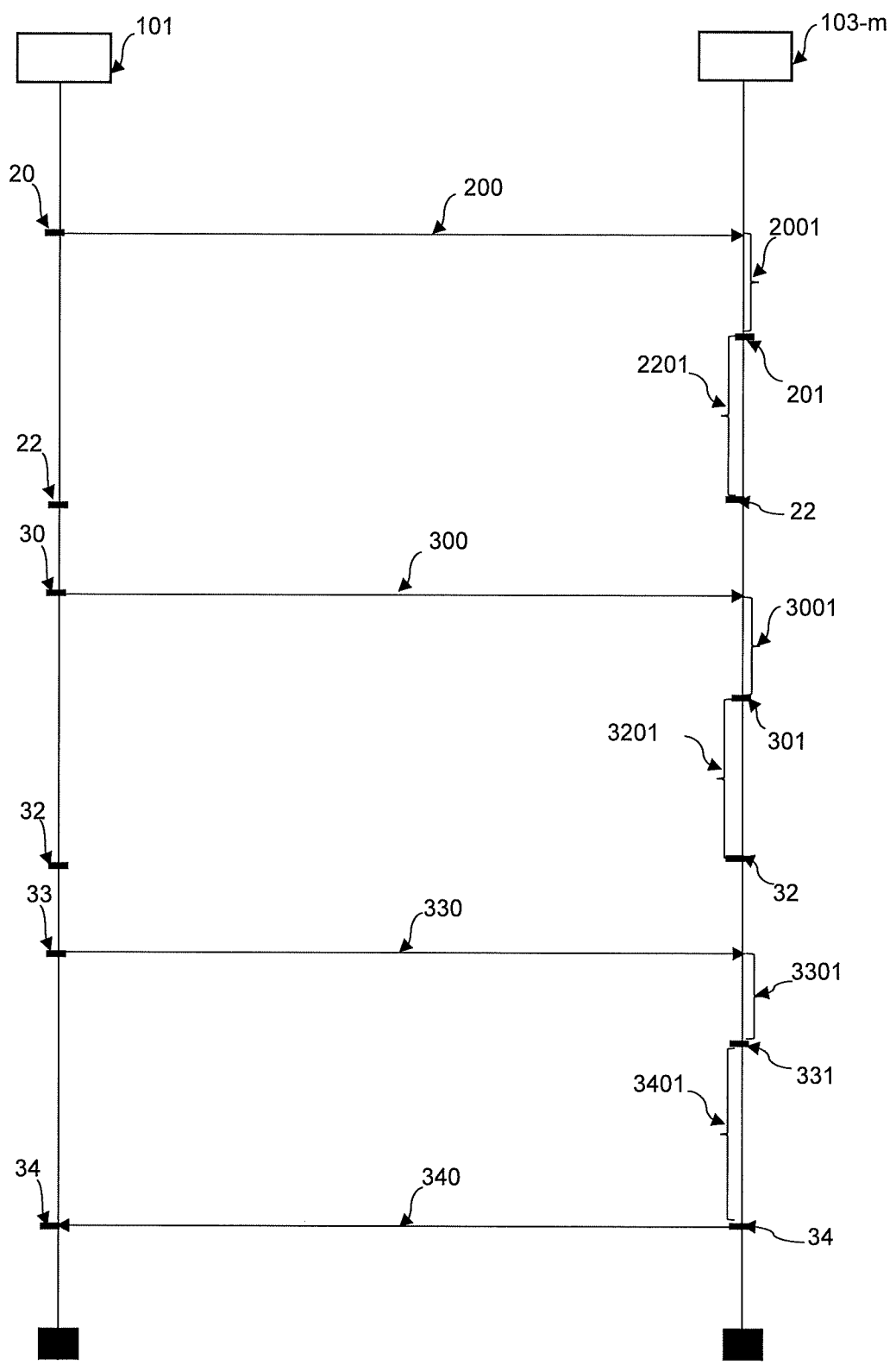
FIG. 3 is a connection flow illustrating an exemplary implementation of the switching of a source bandwidth part to a target bandwidth part, according to some embodiments.

FIG. 3 is a connection flow illustrating an exemplary implementation of the switching of the source bandwidth part to a target bandwidth part in this scenario. In the connection flow of FIG. 3, transmission time intervals are not represented for simplification reasons.

The network entity 101 checks if a data reception non-acknowledgment message 220 is received from the terminal device 103-m at the target transmission time slot 22. The network entity 101 performs at least one iteration of a bandwidth part switch operation if no data reception non-acknowledgment message is received at the target transmission time slot 22.

The bandwidth part switch operation relies on data reception non-acknowledgment messages sent by the terminal device 103-m to the network entity 101 and on not sending downlink data to the terminal device 103-m at the time slot at which the terminal device 103-m schedules reception of data from the network entity 101.

The network entity 101 triggers a first iteration of the bandwidth part switch operation at the current first time slot 30. In this first iteration the assumption is made that the source bandwidth part BWP-S$_m$ is still active at the terminal device 103-m. The network entity 101 sends a current first message 300 to the terminal device 103-m over the source bandwidth part BWP-S$_m$ considered as active at the terminal device 103-m. The current first message 300 comprises:
  a current first information indicating the target bandwidth part BWP-T$_m$;
  a current second information indicating to the terminal device 103-m to schedule reception of data from the network entity 101 at a current first target reception time slot 301, and
  a current third information indicating to the terminal device 103-m to schedule transmission of data reception acknowledgment or non-acknowledgment message to the network entity 101 at a current first target transmission time slot 32.

The current first target reception time slot 301 starts at a number of time slots 3001 after the current first time slot 30 which is higher than the bandwidth switch delay related to the terminal device 103-m.

The current first target transmission time slot 32 starts after a number of slots 3201 at least equal to two after the current first target reception time slot 301.

The network entity 101 indicates in the current second information to the terminal device 103-m to schedule reception of data from the network entity 101 at the current first target reception time slot 301 but will not send any data to the terminal device 103-m at the current first target reception time slot 301. Since the network entity 101 will not send any data to the terminal device 103-m at the current first target reception time slot 301, the network entity 101 expects that the terminal device 103-m sends, at the current first target transmission time slot 32, a data reception non-acknowledgment message to the network entity 101.

The network entity 101 then checks if a data reception non-acknowledgment message is received from the terminal device 103-m at the current first target transmission time slot 32. If no data reception non-acknowledgment message is received from the terminal device 103-m at the current first target transmission time slot 32, the network entity 101 makes the assumption that the terminal device 103-m has switched so that the active bandwidth part at the terminal device 103-m is now the target bandwidth part BWP-T$_m$. The network entity 101 sends at a current second time slot 33 a current second message 330 to the terminal device 103-m over the target bandwidth part BWP-T$_m$. The current second message comprises:
  a current first information indicating the target bandwidth part BWP-T$_m$;
  a current second information indicating to the terminal device 103-m to schedule reception of data from the network entity 101 at a current second target reception time slot 331, and
  a current third information indicating to the terminal device 103-m to schedule transmission of data reception acknowledgment non-acknowledgment message to the network entity 101 at a current second target transmission time slot 34.

The current second target reception time slot 331 starts at a number of time slots 3301 after the current second slot 33 which is higher than the bandwidth switch delay related to the terminal device 103-m.

The current second target transmission time slot 34 starts after a number of slots 3401 at least equal to two after the current second target reception time slot 331.

The network entity 101 indicates in the current second information to the terminal device 103-m to schedule reception of data from the network entity 101 at the current second target reception time slot 331 but will not send any data to the terminal device 103-m at the current second target reception time slot 331. Since the network entity 101 will not send any data to the terminal device 103-m at the current second target reception time slot 331, the network entity 101 expects that the terminal device 103-m sends, at the current second target transmission time slot 34, a data reception non-acknowledgment message to the network entity 101.

The network entity 101 then checks if a data reception non-acknowledgment message is received from the terminal device 103-$m$ at the current second target transmission time slot 34.

If the network entity 101 receives the data reception non-acknowledgment message 340 from the terminal device 103-$m$ at the current second target transmission time slot 34, it has the confirmation that the terminal device 103-$m$ has successfully switched the source bandwidth part to the target bandwidth part. If the network entity 101 does not receive a data reception non-acknowledgment message from the terminal device 103-$m$ at the current second target transmission time slot 34, it performs one or more iterations of the bandwidth part switch operation until receiving a data reception non-acknowledgment message from the terminal device 103-$m$.

The current first target reception time slot 301 and the current second target reception time slot 331 correspond to downlink time slots. The current first target transmission time slot 32 and the current second target transmission time slot 34 correspond to uplink time slots. Scheduling the current first target transmission time slot 32 to start after a number of slots 3201 at least equal to two after the current first target reception time slot 301 guarantees that the terminal device 103-$m$ ends decoding data sent by the network entity 101 before the current first target transmission time slot 32 starts. Similarly, scheduling the current second target transmission time slot 34 to start after a number of slots 3401 at least equal to two after the current second target reception time slot 331 guarantees that the terminal device 103-$m$ ends decoding data sent by the network entity 101 before the current second target transmission time slot 34 starts.

Figure 4:
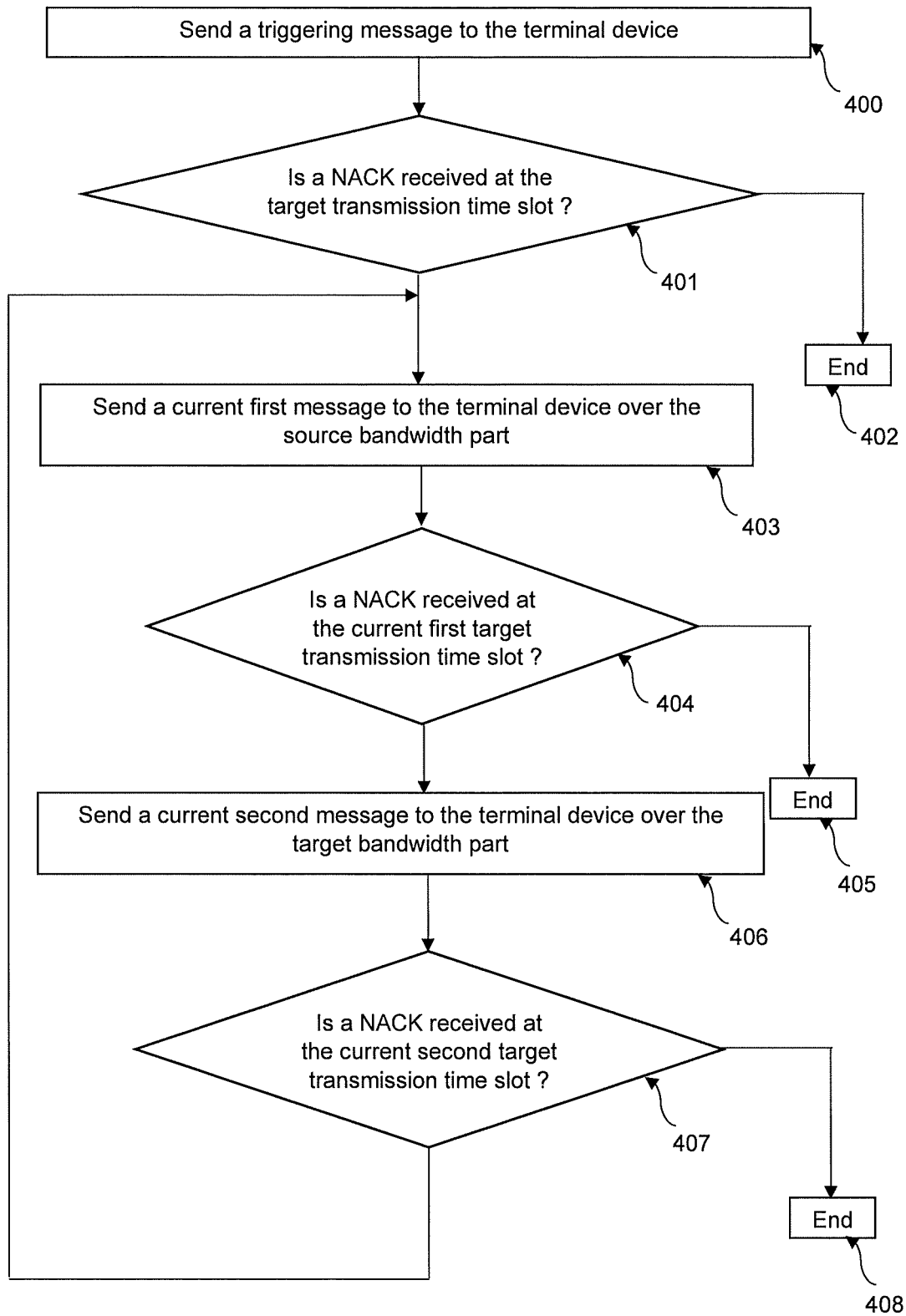
FIG. 4 is a flowchart depicting a method for switching a source bandwidth part to a target bandwidth part, according to some embodiments.

FIG. 4 is a flowchart depicting a method for switching a source bandwidth part BWP-$S_m$ to a target bandwidth part BWP-$T_m$, according to some embodiments. The method may be implemented by a network entity 101 to trigger the switching of the source bandwidth part BWP-$S_m$ used by a terminal device 103-$m$.

At step 400, a triggering message is sent at a triggering time slot to the terminal device 103-$m$, the triggering message comprising:
- a first information indicating the target bandwidth part BWP-$T_m$;
- a second information indicating to the terminal device 103-$m$ to schedule reception of data from the network entity 101 at a target reception time slot. The target reception time slot starts at a number of time slots after the triggering time slot which is higher than a bandwidth switch delay related to the terminal device 103-$m$.
- a third information indicating to the terminal device 103-$m$ to schedule transmission of data reception acknowledgment or non-acknowledgment message to the network entity 101 at a target transmission time slot. The target transmission time slot starts at a number of slots at least equal to two after the target reception time slot.

At step 401, it is determined if a data reception non-acknowledgment message (referred to as 'NACK') is received by the network entity 101 at the target transmission time slot.

If it is determined that a NACK is received at the target transmission time slot, the processing ends at step 402. This means that the terminal device 103-$m$ has successfully received and decoded the triggering message indicating the bandwidth switch request and consequently that the requested bandwidth part switch has been successfully performed by the terminal device 103-$m$.

If it is determined at step 401 that no NACK is received at the target transmission time slot, a bandwidth part switch operation is performed at steps 403 to 408 until a NACK is received by the network entity 101. The bandwidth part switch operation comprises thus one or more iterations, a current iteration comprising the steps 403 to 407.

At step 403, a current first message is sent, by the network entity 101, to the terminal device 103-$m$ over the source bandwidth part considered as active at the terminal device 103-$m$. The current first message comprises:
- a current first information indicating the target bandwidth part BWP-$T_m$;
- a current second information indicating to the terminal device 103-$m$ to schedule reception of data from the network entity 101 at a current first target reception time slot. The current first target reception time slot starts at a number of time slots after the current first time slot which is higher than the bandwidth switch delay related to the terminal device 103-$m$, and
- a current third information indicating to the terminal device 103-$m$ to schedule transmission of data reception acknowledgment or non-acknowledgment message to the network entity 101 at a current first target transmission time slot. The current first target transmission time slot starts after a number of slots at least equal to two after the current first target reception time slot.

At step 404, it is determined if a data reception non-acknowledgment message is received by the network entity 101 at the current first target transmission time slot.

If it is determined that a NACK is received at the current first target transmission time slot, the processing ends at step 405. This means that the terminal device 103-$m$ has successfully received and decoded the current first message carrying the bandwidth switch request and consequently that the requested bandwidth part switch has been successfully performed by the terminal device 103-$m$.

If it is determined at step 404 that a NACK is not received at the current first target transmission time slot, step 406 is performed.

At step 406, a current second message is sent, by the network entity 101, to the terminal device 103-$m$ over the target bandwidth part BWP-$T_m$ considered as active at the terminal device 103-$m$. The current second message comprises:
- a current first information indicating the target bandwidth part BWP-$T_m$;
- a current second information indicating to the terminal device 103-$m$ to schedule reception of data from the network entity 101 at a current second target reception time slot. The current second target reception time slot starts at a number of time slots after the current second slot which is higher than the bandwidth switch delay related to the terminal device 103-$m$, and
- a current third information indicating to the terminal device 103-$m$ to schedule transmission of data reception acknowledgment or non-acknowledgment message to the network entity 101 at a current second target transmission time slot starting after a number of slots at least equal to two after the current second target reception time slot.

At step 407, it is determined if a data reception non-acknowledgment message is received by the network entity 101 at the current second target transmission time slot.

If it is determined that a NACK is received at the current second target transmission time slot, the processing ends at step 408. This means that the terminal device 103-*m* has successfully received and decoded the current second message carrying the bandwidth switch request and consequently that the requested bandwidth part switch has been successfully performed by the terminal device 103-*m*.

If it is determined at step 407 that no NACK is received at the current second target transmission time slot, a new iteration of the bandwidth part switch operation is triggered at step 403 and is repeated until successful bandwidth switch is obtained by the reception of a data reception non-acknowledgment message by the network entity 101 or until a radio link failure happens.

The above described embodiments enable Uplink BWP switch even when the terminal device 103-*m* has no traffic to send to the network entity 101 and enable Downlink BWP switch even when there is no downlink data to send to the terminal device 103-*m*. When the terminal device 103-*m* switches to a narrower target bandwidth part, it enables to reduce the power battery consumption at the terminal device 103-*m*. Further, the above described embodiments enable providing the network entity 101 with a feedback on the success of the BWP switch operation.

Figure 5A:
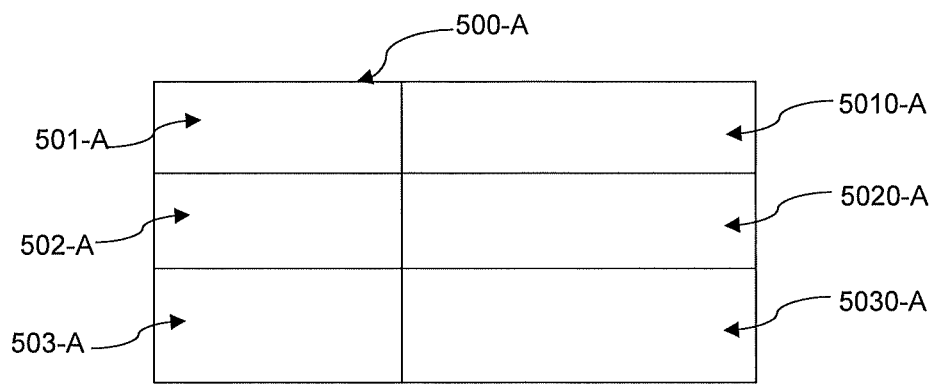
FIG. 5A is a block diagram illustrating a data structure for storing bandwidth part switching information, according to some embodiments.

FIG. 5A is a block diagram illustrating a data structure 500-A used to store the information comprised in the triggering message 200.

The data structure 500-A comprises data fields (also referred to as 'data elements'). Each data field comprises an attribute field and a value field.

For example, the data fields comprise:
- a first data field comprising a first attribute field 501-A and a first value field 5010-A, the first value field 5010-A comprising information indicating the target bandwidth part;
- a second data field comprising a second attribute field 502-A and a second value field 5020-A, the second value field 5020-A comprising information indicating to the terminal device 103-*m* to schedule reception of data from the network entity 101 at a target reception time slot which is higher than the bandwidth switch delay related to the terminal device 103-*m*;
- a third data field comprising a third attribute field 503 and a third value field 5030, the third value field 5030 comprising information indicating to the terminal device 103-*m* to schedule transmission of data reception acknowledgment or non-acknowledgment message to the network entity 101 at a target transmission time slot, the target transmission time slot starting after a number of slots at least equal to two after the target reception time slot.

In an exemplary application to 5G communication systems, the triggering message 200 and the current first and second messages 300 and 330 sent by the network entity 101 for the bandwidth part switching at a terminal device 103-*m* are downlink control information (DCI) format 1_1 messages as defined in the 3GPP TS38.133 standard specifications.

In this exemplary application, the triggering message 200 (respectively the current first and second messages 300 and 330) is sent by the network entity 101 to the terminal device 103-*m* over a physical downlink control channel (PDCCH) at the triggering time slot 20 (respectively at the current first and second time slots 30 and 33).

The terminal device 103-*m* schedules reception of data from the network entity 101 over a physical downlink shared channel (PDSCH) such that the target reception time slot 201 and the current first and current second target reception time slots 301 and 331 correspond to downlink time slots at which data is scheduled on the PDSCH.

The data reception non-acknowledgment message is sent by the terminal device 103-*m* over a physical uplink control channel (PUCCH) such that the target transmission time slot 201 and the current first and current second target transmission time slots 301 and 331 correspond to uplink time slots at which the transmission of the data reception non-acknowledgment message is scheduled on the physical uplink control channel. The data reception non-acknowledgment message is, for example, an HARQ feedback comprising a NACK value.

The bandwidth part switch delay related to the terminal device 103-*m* depends on the numerology supported by the terminal device 103-*m* that defines the sub-carrier spacing type supported by the terminal device 103-*m*. Bandwidth part switch delays for different numerologies and different types of terminal devices are specified in the TS38.133 standard specification (table 8.6.2-1).

In an exemplary embodiment, the target reception time slot 201 and the current first and second reception time slots 301 and 331 start respectively at a number of time slots 2001, 3001 and 3301 after the triggering time slot 20 and the current first and current second time slots 30 and 33 respectively, the numbers of time slots 2001, 3001 and 3301 being equal to the incrementation by one time slot of the bandwidth part switch delay related to the terminal device 103-*m*. Accordingly, using the values of the bandwidth part switch delay specified in the TS38.133 standard specification, the numbers of time slots 2001, 3001 and 3301 are equal to 3 time slots if the terminal device 103-*m* is configured to support numerology 1 and device type 1 and are equal to 6 time slots if the terminal device 103-*m* is configured to support numerology 1 and device type 2. Setting the numbers of slots 2001, 3001 and 3301 by incrementing by one time slot the bandwidth part switch delay enables accelerating the bandwidth part switch operation.

In another exemplary embodiment, the numbers of time slots 2001, 3001 and 3301 are equal to 6 time slots for a terminal device 103-*m* configured to support numerology 1 whatever the device type supported by the terminal device 103-*m* is the device type 1 or type 2. Setting the numbers of slots 2001, 3001 and 3301 fixed independently on the device type supported by the terminal device 103-*m* enables simplifying the implementation of the bandwidth part switch operation.

Once the network entity 101 has decided to trigger the switching of the active source bandwidth of the terminal device 103-*m*, the network entity 101 sets/determines the target transmission time slot depending on the bandwidth switch delay related to the terminal device 103-*m*. Then the network entity 101 checks if the triggering time slot 20 at which it plans to send the triggering message for requesting the bandwidth part switch is such that the target transmission time slot 201 corresponds to a PDSCH comprising PDSCH symbols. If the triggering time slot 20 does not satisfy this condition, the network entity 101 delays sending the triggering message 200 to the terminal device 103-*m* until the condition is satisfied.

In the case of DCI format 1_1 messages, the triggering message 200, the first current message 300 and the current second message 330 comprise further a fourth information that is a frequency domain information that depends on the size of the bandwidth part considered as active at the terminal device 103-*m* when the triggering message 200, the first current message 300 or the current second message 330 is sent.

Figure 5B:
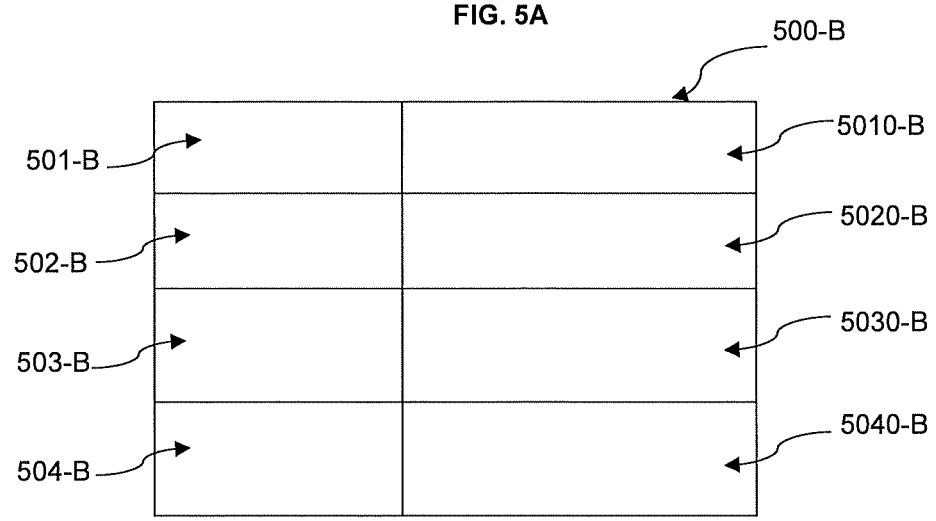
FIG. 5B is a block diagram illustrating a data structure for storing bandwidth part switching information, according to some embodiments.

FIG. 5B is a block diagram illustrating a data structure 500-B used to store the information comprised in the triggering message 200, the current first message 300 or the current second message 330 in the case of DCI format 1_1 messages.

The data structure 500-B comprises data fields. Each data field comprises an attribute field and a value field.

For example, the data fields comprise:
- a first data field comprising a first attribute field 501-B and a first value field 5010-B, the first value field 5010-B comprising information indicating the target bandwidth part;
- a second data field comprising a second attribute field 502-B and a second value field 5020-B, the second value field 5020-B comprising information indicating to the terminal device 103-*m* to schedule reception of data from the network entity 101 at the target reception time slot at which data is scheduled to be received from the network entity 101;
- a third data field comprising a third attribute field 503-B and a third value field 5030-B, the third value field 5030-B comprising information indicating to the terminal device 103-*m* to schedule transmission of data reception acknowledgment or non-acknowledgment message to the network entity 101 at a target transmission time slot;
- a fourth data field comprising a fourth attribute field 504-B and a fourth value field 5040-B, the fourth value field 5040-B comprising a frequency domain information that depends on the size of the bandwidth part considered as active at the terminal device 103-*m*.

In the case of DCI format 1_1 messages, the data structure 500-B used for storing the information of the triggering message 200 may be set as follows:
- the first attribute field 501-B indicates a "bandwidth part indicator" and the first value field 5010-B comprises information indicating the target bandwidth part;
- the second attribute field 502-B indicates a "time domain resource assignment" and the second value field 5020-B comprises information indicating to the terminal device 103-*m* the target reception time slot 201 to schedule reception of data from the network entity 101. The information comprises information related to a time start symbol (referred to Time Domain Resource Assignment Start Symbol or tdra startsymbol) and a length (referred to as Time Domain Resource Assignment length or tdra length). The time start symbol and the length ensure that the terminal device 103-*m* will end decoding the last PDSCH symbol before the starting of the target transmission time slot 22 at which the data reception non-acknowledgment message is expected to be sent);
- the third attribute field 503-B indicates a "feedback timing indicator" and the third value field 5030 comprises information indicating to the terminal device 103-*m* the target transmission time slot 22 to schedule transmission of data reception acknowledgment or non-acknowledgment message to the network entity 101;
- the fourth attribute field 504-B indicates a "frequency domain resource assignment fdra" and the fourth value field 5040-B comprises any legal value matching the size of the source bandwidth part. In an embodiment using the HARQ protocol, the attribute field 503-B is given by "PDSCH-to-HARQ_feedback timing indicator".

The data structure 500-B used to store the information comprised in the current first message 300 may be set as follows:
- the first attribute field 501-B indicates a "bandwidth part indicator" and the first value field 5010-B comprises information indicating the target bandwidth part;
- the second attribute field 502-B indicates a "time domain resource assignment" and the second value field 5020-B comprises information indicating to the terminal device 103-*m* the current first target reception time slot 301 to schedule reception of data from the network entity 101. The information comprises information related to a time start symbol and a length that ensure that the terminal device 103-*m* will end decoding the last PDSCH symbol before the starting of the current first target transmission time slot 32;
- the third attribute field 503-B indicates a "feedback timing indicator" and the third value field 5030-B comprises information indicating to the terminal device 103-*m* the current first target transmission time slot 32 to schedule transmission of data reception acknowledgment or non-acknowledgment message to the network entity 101.
- the fourth attribute field 504-B indicates a "frequency domain resource assignment fdra" and the fourth value field 5040-B comprises any legal value matching the size of the source bandwidth part.

The data structure 500-B used to store the information comprised in the current second message 330 may be set as follows:
- the first attribute field 501-B indicates a "bandwidth part indicator" and the first value field 5010-B comprises information indicating the target bandwidth part;
- the second attribute field 502-B indicates a "time domain resource assignment" and the second value field 5020-B comprises information indicating to the terminal device 103-*m* the current second target reception time slot 331 to schedule reception of data from the network entity 101. The information comprises information related to a time start symbol and a length that ensure that the terminal device 103-*m* will end decoding the last PDSCH symbol before the starting of the current second target transmission time slot 34;
- the third attribute field 503-B indicates a "feedback timing indicator" and the third value field 5030-B comprises information indicating to the terminal device 103-*m* the current second target transmission time slot 34 to schedule transmission of data reception acknowledgment or non-acknowledgment message to the network entity 101.
- the fourth attribute field 504-B indicates a "frequency domain resource assignment fdra" and the fourth value field 5040-B comprises any legal value matching the size of the target bandwidth part.

It should be appreciated by those skilled in the art that any functions, engines, block diagrams, flow diagrams, state transition diagrams and/or flowcharts herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or apparatus, whether such computer or processor is explicitly shown.

Each described computation function, block, step can be implemented in hardware, software, firmware, middleware, microcode, or any suitable combination thereof. If implemented in software, the computation functions, blocks of the block diagrams and/or flowchart illustrations can be implemented by computer program instructions/software code, which may be stored or transmitted over a computer-readable medium, or loaded onto a general purpose computer, special purpose computer or other programmable processing apparatus and/or system to produce a machine, such that the computer program instructions or software code which execute on the computer or other programmable apparatus, create the means for implementing the functions described herein.

When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause an apparatus to perform the necessary tasks. Additionally, the processor, memory and example algorithms, encoded as computer program code, serve as means for providing or causing performance of operations discussed herein.

For example, the functions described here for the network entity 101 may be performed by a corresponding apparatus.

In the present description, block denoted as "means configured to" perform a certain function or "means for" performing a certain function shall be understood as functional blocks comprising circuitry that is adapted for performing or configured to perform a certain function. A means being configured to perform a certain function does, hence, not imply that such means necessarily is performing said function (at a given time instant). Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

As used in this application, the term "circuit" or "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation."

This definition of "circuit" or "circuitry" applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, an integrated circuit for a network element or network node or any other computing device or network device. The term circuitry may cover digital signal processor (DSP) hardware, network processor, application specific integrated circuit (ASIC), field programmable gate array (FPGA), etc.

The "circuit" or "circuitry" may be or include, for example, hardware, programmable logic, a programmable processor that executes software or firmware, and/or any combination thereof (e.g. a processor, control unit/entity, controller) to execute instructions or software and control transmission and receptions of signals, and a memory to store data and/or instructions.

The "circuit" or "circuitry" may also make decisions or determinations, generate frames, packets or messages for transmission, decode received frames or messages for further processing, and other tasks or functions described herein. The circuitry may control transmission of signals or messages over a radio network, and may control the reception of signals or messages, etc., via a radio network (e.g., after being down-converted by radio transceiver, for example).

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

The methods and devices described herein may be implemented by various means. For example, these techniques may be implemented in hardware, software, or a combination thereof. For a hardware implementation, the processing elements of the different network elements operating in the communication system 10 can be implemented for example according to a hardware-only configuration (for example in one or more FPGA, ASIC, or VLSI integrated circuits with the corresponding memory) or according to a configuration using both VLSI and Digital Signal Processor (DSP).

Figure 6:
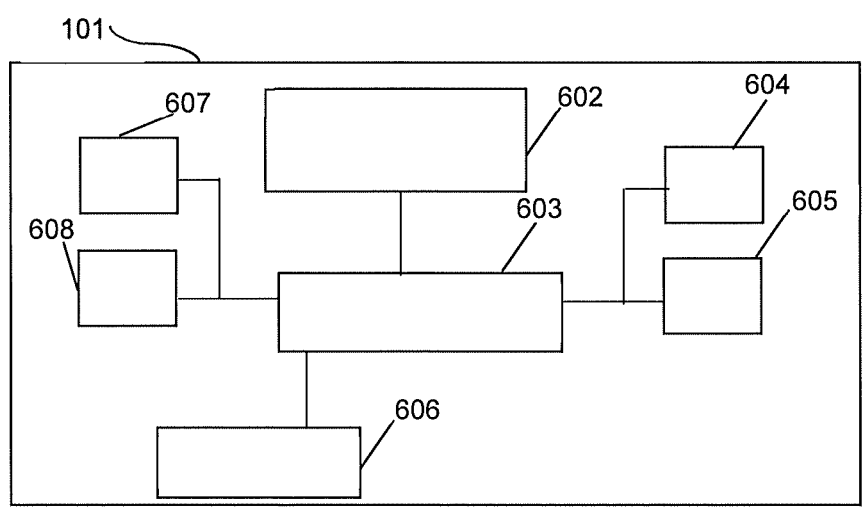
FIG. 6 is a block diagram illustrating an exemplary hardware structure of a network entity, according to some embodiments.

FIG. 6 is a block diagram representing an exemplary hardware/software architecture of the network entity 101 operating in the communication system 10.

As illustrated, the architecture may include various computing, processing, storage, communication, and displaying units comprising:

communication circuitry comprising a transceiver 602 (e.g. wireless transceiver) configured to connect the network entity 101 to corresponding links in the communication system 10, and to ensure transmission/reception of data and/or signals. The communication circuitry may support various network and air interface such as wired, optical fiber, and wireless networks;

a processing unit 603 configured to execute the computer-executable instructions to run the methods and algorithms according to the various embodiments and perform the various required functions of the device such as the generation and transmission of the messages for bandwidth part switch and any functionalities required to enable the network entity 101 to operate in the communication system 10 according to the various embodiments. The processing unit 602 may be a general purpose processor, a special purpose processor, a DSP, a plurality of microprocessors, a controller, a microcontroller, an ASIC, an FPGA circuit, any type of integrated circuit, and the like;

a power source 604 that may be any suitable device providing power to the network entity 101;

a localization unit 605 such as a GPS chipset implemented in applications that require information indicating the location of the network entity 101;

a storage unit 606 possibly comprising a random access memory (RAM) or a read-only memory used to store data (e.g. root cause analysis data) and any data required to perform the functionalities of the network entity 101 according to the embodiments;

Input peripherals 607;

Output peripherals 608 comprising communication means such as displays enabling for example man-to-machine interaction between the network entity 101 and the communication system 10 administrator for example for configuration and/or maintenance purposes.

The architecture of the network entity 101 may further comprise one or more software and/or hardware units configured to provide additional features, functionalities and/or network connectivity.

Furthermore, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

For example, the program comprises instructions stored on the computer-readable storage medium that, when executed by a processor, cause the processor to send a triggering message at a triggering time slot to a terminal device, the triggering message comprising:

a first information indicating the target bandwidth part;

a second information indicating to the terminal device to schedule reception of data from the apparatus at a target reception time slot, the target reception time slot starting at a number of slots after the triggering time slot which is higher than a bandwidth switch delay related to the terminal device;

a third information indicating to the terminal device to schedule transmission of data reception acknowledgment or non-acknowledgment message to the apparatus at a target transmission time slot, the target transmission time slot starting after a number of slots at least equal to two after the target reception time slot.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A network entity for switching a source bandwidth part used by a terminal device to a target bandwidth part, wherein the network entity comprises circuitry configured for sending a triggering message at a triggering time slot to the terminal device, the triggering message comprising:

a first information indicating the target bandwidth part;

a second information indicating to the terminal device to schedule reception of data from the network entity at a target reception time slot, the target reception time slot starting at a number of slots after the triggering time slot, the number of slots being higher than a bandwidth switch delay related to the terminal device;

a third information indicating to the terminal device to schedule transmission of a data reception acknowledgment or non-acknowledgment message to the network entity at a target transmission time slot, the target transmission time slot starting after a number of slots at least equal to two after the target reception time slot, wherein the network entity comprises circuitry configured for checking if a data reception non-acknowledgment message is received from the terminal device at the target transmission time slot, the circuitry for sending the triggering message being configured, if no data reception non-acknowledgment message is received at the target transmission time slot, to perform at least one iteration of a bandwidth switch operation, a current iteration comprising:

sending a current first message to the terminal device at a current first time slot over the source bandwidth part considered as active at the terminal device and checking if a data reception non-acknowledgment message is received from the terminal device at a current first target transmission time slot;

if no data reception non-acknowledgement message is received, sending a current second message to the terminal device at a current second time slot over the target bandwidth part considered as active at the terminal device and checking if a data reception non-acknowledgment message is received from the terminal device at a current second target transmission time slot;

the current first message, respectively the current second message comprising:

a current first information indicating the target bandwidth part;

a current second information indicating to the terminal device to schedule reception of data from the network entity at a current first, respectively second, target reception time slot, the current first, respectively second, target reception time slot starting at a number of slots respectively after the current first, respectively second, time slot, the numbers of slots and being higher than the bandwidth switch delay related to the terminal device;

a current third information indicating to the terminal device to schedule transmission of a data reception acknowledgment or non-acknowledgment message to the network entity at the current first, respectively second, target transmission time slot, the current first, respectively second, target transmission time slot starting after a number of slots respectively at least equal to two after the current first, respectively second, target reception time slot.

2. The network entity of claim 1, wherein the data reception non-acknowledgement message is indicative of a successful switch, at the terminal device of the source bandwidth to the target bandwidth.

3. The network entity of claim 1, wherein the triggering message, the current first message and the current second message are sent over physical downlink control channels.

4. The network entity of claim 3, wherein the data reception non-acknowledgement message is sent over a physical uplink control channel.

5. The network entity of claim 1, wherein the numbers of slots are equal to the incrementation by one time slot of the bandwidth part switch delay related with the terminal device.

6. The network entity of claim 4, wherein the target reception time slot, the current first and current second target reception time slot correspond to downlink time slots at which data is scheduled on physical downlink shared channels and the target transmission time slot, the current first and current second correspond to uplink time slots at which the transmission of the data reception non-acknowledgement message is scheduled on physical uplink control channels.

7. The network entity of claim 1, wherein the current first message comprises a frequency domain information dependent on the size of the source bandwidth part.

8. The network entity of claim 1, wherein the current second message comprises a frequency domain information dependent on the size of the target bandwidth part.

9. A method for switching a source bandwidth part used by a terminal device to a target bandwidth part, wherein the method comprises sending a triggering message at a triggering time slot to the terminal device, the message comprising:

a first information indicating the target bandwidth part;
a second information indicating to the terminal device to schedule reception of data from the network entity at a target reception time slot, the target reception time slot starting at a number of slots after the triggering time slot, the number of slots being higher than a bandwidth switch delay related with the terminal device;
a third information indicating to the terminal device to schedule transmission of data reception acknowledgment or non-acknowledgment message to the network entity at a target transmission time slot, the target transmission time slot starting after a number of slots at least equal to two after the target reception time slot, wherein the method comprises:
checking if a data reception non-acknowledgment message is received from the terminal device at the target transmission time slot, the method comprising, if no data reception non-acknowledgment message is received at the target transmission time slow, performing at least one iteration of a bandwidth switch operation, a current iteration comprising:
sending a current first message to the terminal device at a current first time slot over the source bandwidth considered as active at the terminal device, and checking if a data reception non-acknowledgment message is received from the terminal device at a current first target transmission time slot;
if no data reception non-acknowledgement message is received, sending a current second message to the terminal device at a current second time slot over the target bandwidth considered as active at the terminal device, and checking if a data reception non-acknowledgement message is received from the terminal device at a current second target transmission time slot;
the current first message, respectively the current second message, comprising:
a current first information indicating the target bandwidth part; a current second information indicating to the terminal device to schedule reception of data from the network entity at a current first, respectively second, target reception time slot, the current first, respectively second, target reception time slot starting at a number of slots after the current first, respectively second, time slot, the number of slots being higher than the bandwidth switch delay related with the terminal device;
a current third information indicating to the terminal device to schedule transmission of data reception acknowledgment or non-acknowledgment message to the network entity at the current first, respectively second, target transmission time slot, the current first, respectively second, target transmission time slot starting after a number of slots at least equal to two after the current first, respectively second, target reception time slot.

10. Utilization of the method for switching a source bandwidth part used by a terminal device to a target bandwidth part according to claim 9 for switching downlink bandwidth parts in a communication system based on a time division duplex technology.

11. A non-transitory computer-readable medium storing computer-executable instructions that, when executed by at least one processor at an apparatus, cause the apparatus to perform the method according to claim 9.

* * * * *